(12) United States Patent
Chen et al.

(10) Patent No.: US 12,184,321 B2
(45) Date of Patent: Dec. 31, 2024

(54) METHOD AND APPARATUS FOR CONTROLLING RADIO FREQUENCY EXPOSURE OF WIRELESS DEVICE, AND WIRELESS DEVICE

(71) Applicant: Huawei Technologies Co., Ltd., Shenzhen (CN)

(72) Inventors: Yiling Chen, Shanghai (CN); Wei Liu, Shanghai (CN); Weitao Jing, Shanghai (CN); Yi Sui, Shanghai (CN); Zhijun Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 239 days.

(21) Appl. No.: 17/639,420

(22) PCT Filed: Sep. 2, 2020

(86) PCT No.: PCT/CN2020/112956
§ 371 (c)(1),
(2) Date: Mar. 1, 2022

(87) PCT Pub. No.: WO2021/043153
PCT Pub. Date: Mar. 11, 2021

(65) Prior Publication Data
US 2022/0302945 A1    Sep. 22, 2022

(30) Foreign Application Priority Data
Sep. 2, 2019    (CN) .......................... 201910822948.8

(51) Int. Cl.
*H04B 1/3827* (2015.01)
*H04W 52/22* (2009.01)
*H04W 52/36* (2009.01)

(52) U.S. Cl.
CPC ........ *H04B 1/3838* (2013.01); *H04W 52/225* (2013.01); *H04W 52/36* (2013.01)

(58) Field of Classification Search
CPC ...... H04B 1/3838; H04B 1/38; H04B 1/3833; H04B 17/318; H04B 17/12;
(Continued)

(56) References Cited

U.S. PATENT DOCUMENTS 9,237,531 B2 *  1/2016  Lu ...................... H04W 52/367
9,622,187 B2    3/2017  Logan et al.
(Continued)

FOREIGN PATENT DOCUMENTS

CN    101176273 A    5/2008
CN    103493552 A    1/2014
(Continued)

Primary Examiner — Lana N Le
(74) Attorney, Agent, or Firm — Conley Rose, P.C.

(57) ABSTRACT

A method includes obtaining an average radio frequency exposure value over a target time window, where the target time window is a standard time window, determining a power threshold corresponding to the average radio frequency exposure value, where the power threshold is a preset power value corresponding to a preset value range to which the average radio frequency exposure value belongs, and controlling a transmit power of the wireless device based on the power threshold over a controlled time window.

20 Claims, 5 Drawing Sheets

---

Obtain an average radio frequency exposure value over a target time window — 101

Determine a power threshold corresponding to the average radio frequency exposure value — 102

Control a transmit power of a wireless device based on the power threshold over a controlled time window — 103

(58) Field of Classification Search
CPC . H04W 52/225; H04W 52/36; H04W 52/367; H04W 88/02; H04W 52/241; H04W 72/0473; H04W 52/245; H04W 52/288; H04W 52/285; H04W 52/38; Y02D 30/70
See application file for complete search history.

(56) References Cited

U.S. PATENT DOCUMENTS

| | | | |
|---|---|---|---|
| 10,375,632 B1* | 8/2019 | Stein | H04W 52/36 |
| 10,447,413 B1* | 10/2019 | Nadakuduti | H04B 17/18 |
| 10,965,335 B1* | 3/2021 | Jadhav | H04W 52/14 |
| 2003/0045317 A1* | 3/2003 | Pan | H04W 52/288 455/518 |
| 2003/0099305 A1 | 5/2003 | Yi et al. | |
| 2005/0101326 A1 | 5/2005 | Kang et al. | |
| 2012/0021707 A1 | 1/2012 | Forrester et al. | |
| 2012/0021800 A1* | 1/2012 | Wilson | H04W 72/02 455/127.1 |
| 2012/0270592 A1 | 10/2012 | Ngai et al. | |
| 2013/0034079 A1 | 2/2013 | Takano | |
| 2013/0045700 A1* | 2/2013 | Stallman | H04B 1/3838 455/129 |
| 2013/0169348 A1 | 7/2013 | Shi | |
| 2014/0087663 A1* | 3/2014 | Burchill | H04W 52/38 455/522 |
| 2014/0161048 A1* | 6/2014 | Attar | H04W 52/367 |
| 2014/0248892 A1 | 9/2014 | Wilson et al. | |
| 2014/0274190 A1 | 9/2014 | Lu et al. | |
| 2014/0313041 A1* | 10/2014 | Tesanovic | H04B 1/3838 340/657 |
| 2017/0064641 A1 | 3/2017 | Logan et al. | |
| 2017/0125916 A1 | 5/2017 | Camacho et al. | |
| 2017/0311330 A1 | 10/2017 | Gandhi | |
| 2018/0287650 A1* | 10/2018 | Mercer | H04B 1/38 |
| 2019/0124605 A1 | 4/2019 | Park et al. | |
| 2019/0165824 A1 | 5/2019 | Mohamed et al. | |
| 2021/0306022 A1* | 9/2021 | Fernando | H04B 1/3838 |

FOREIGN PATENT DOCUMENTS

| | | |
|---|---|---|
| CN | 103685740 A | 3/2014 |
| CN | 106452490 A | 2/2017 |
| CN | 107039743 A | 8/2017 |
| CN | 107359887 A | 11/2017 |
| CN | 107623943 A | 1/2018 |
| CN | 107994956 A | 5/2018 |
| CN | 108174024 A | 6/2018 |
| CN | 108833030 A | 11/2018 |
| EP | 2786501 A1 | 10/2014 |
| EP | 3474609 A1 | 4/2019 |
| JP | 2012170071 A | 9/2012 |
| JP | 2013537755 A | 10/2013 |
| RU | 2280958 C2 | 7/2006 |
| RU | 2338323 C2 | 11/2008 |
| WO | 2008042813 A2 | 4/2008 |
| WO | 2009114640 A2 | 9/2009 |
| WO | 2011148820 A1 | 12/2011 |
| WO | 2012067563 A1 | 5/2012 |
| WO | 2012173570 A1 | 12/2012 |
| WO | 2013103690 A1 | 7/2013 |
| WO | 2016053930 A1 | 4/2016 |
| WO | 2018191036 A1 | 10/2018 |

* cited by examiner

METHOD AND APPARATUS FOR CONTROLLING RADIO FREQUENCY EXPOSURE OF WIRELESS DEVICE, AND WIRELESS DEVICE

CROSS-REFERENCE TO RELATED APPLICATIONS

This is a U.S. National Stage of International Patent Application No. PCT/CN2020/112956 filed on Sep. 2, 2020, which claims priority to Chinese Patent Application No. 201910822948.8 filed on Sep. 2, 2019. Both of the aforementioned applications are hereby incorporated by reference in their entireties.

TECHNICAL FIELD

This application relates to the field of wireless communications technologies, and in particular, to a method and an apparatus for controlling radio frequency exposure of a wireless device, and the wireless device.

BACKGROUND

With the development of wireless communications technologies, applications of various wireless devices become more popular, such as mobile phones, tablet computers (portable Android device, Pad), and personal digital assistants (personal digital assistants, PDAs). The wireless devices also bring a problem of radio frequency exposure while bringing convenience to people. In other words, radio frequency radiation energy of the wireless devices damages human health. For the problem of radio frequency exposure, various countries and regions such as the Federal Communications Commission (federal communications commission. FCC), the European Community (CE) have developed corresponding standards that specify an average radio frequency exposure value over a fixed time period (for example, 6 minutes), which shall not exceed a standard-specified maximum radio frequency exposure value. In this specification, a time period whose duration is equal to standard-specified fixed duration is briefly referred to as a standard time window, and a standard-specified maximum radio frequency exposure value is briefly referred to as a standard radio frequency exposure value.

In the conventional technology, to control an average radio frequency exposure value of a wireless device over any standard time window not to exceed the standard radio frequency exposure value, a running status of the wireless device is detected in real time to determine radio frequency exposure of the wireless device. When a radio frequency exposure value is large and may exceed the standard radio frequency exposure value, a transmit power of the wireless device is reduced through power back-off, so that a radio frequency exposure value of the wireless device at each moment does not exceed the standard radio frequency exposure value. In this way, the average radio frequency exposure value of the wireless device is controlled to be less than the standard radio frequency exposure value. Alternatively, a sensor is used to detect whether a user is close to the wireless device in real time. When it is detected that the user is close to the wireless device, a transmit power of the wireless device is reduced through power back-off. In this way, the average radio frequency exposure value of the wireless device is controlled to be less than the standard radio frequency exposure value. In the foregoing two manners of controlling radio frequency exposure of the wireless device, power back-off is performed in real time based on an actual running status of the wireless device. Although the average radio frequency exposure value of the wireless device can be controlled to be less than the standard radio frequency exposure value, communication performance of the wireless device is greatly affected, and even communication interruption may be caused.

It can be learned that the existing method for controlling radio frequency exposure of a wireless device greatly affects communication performance of the wireless device and even causes communication interruption, and has poor applicability.

SUMMARY

Embodiments of this application provide a method and an apparatus for controlling radio frequency exposure of a wireless device, and the wireless device, to resolve problems that an existing method for controlling radio frequency exposure of a wireless device greatly affects communication performance of the wireless device and even causes communication interruption, and has poor applicability.

According to a first aspect, an embodiment of this application provides a method for controlling radio frequency exposure of a wireless device. The method includes: obtaining an average radio frequency exposure value over a target time window, where the target time window is a standard time window; determining a power threshold corresponding to the average radio frequency exposure value, where the power threshold is a preset power value corresponding to a preset value range to which the average radio frequency exposure value belongs; and controlling a transmit power of the wireless device based on the power threshold over a controlled time window, where a start moment of the controlled time window is an end moment of the target time window, and duration of the controlled time window is shorter than duration of the standard time window.

In this implementation, after the controlling starts, the average radio frequency exposure value over the target time window corresponding to the controlled time window is first obtained, then the power threshold corresponding to the average radio frequency exposure value is determined, and finally, the transmit power of the wireless device is controlled based on the power threshold over the controlled time window. Because the power threshold is set according to an actual application scenario, the wireless device operates based on the corresponding power threshold in any controlled time window, and therefore it can be ensured that an average radio frequency exposure value of the wireless device over any standard time window does not exceed a standard radio frequency exposure value. In addition, when the power threshold is appropriately set, communication performance of the wireless device is not affected. Moreover, the power threshold may be determined based on a preset correspondence between a preset value range of an average radio frequency exposure value and a preset power value, without requiring real-time calculation. Therefore, a calculation amount is smaller, and radio frequency exposure control efficiency is higher.

With reference to the first aspect, in a first possible implementation of the first aspect, the power threshold is a transmit power threshold. The controlling a transmit power of the wireless device based on the power threshold over a controlled time window includes: adjusting an actual transmit power of the wireless device over the controlled time window, so that the actual transmit power is less than or equal to the transmit power threshold.

In this implementation, a transmit power threshold corresponding to each controlled time window may be determined, and the actual transmit power of the wireless device only needs to be controlled within the corresponding transmit power threshold in each controlled time window. In this way, it can be ensured that an average radio frequency exposure value of the wireless device over any standard time window does not exceed the standard radio frequency exposure value. Therefore, the control process is simpler, and control efficiency is higher.

With reference to the first aspect, in a second possible implementation of the first aspect, the power threshold is a power back-off amount threshold. The controlling a transmit power of the wireless device based on the power threshold over a controlled time window includes: controlling, over the controlled time window, the wireless device to perform transmit power back-off based on a target power back-off amount, where the target power back-off amount is greater than or equal to the power back-off amount threshold.

In this implementation, a power back-off amount threshold corresponding to each controlled time window may be determined based on a preset correspondence between a preset value range of an average radio frequency exposure value and a preset power value, and transmit power back-off is performed on the wireless device based on the corresponding power back-off amount threshold only within each controlled time window. In this way, it can be ensured that an average radio frequency exposure value of the wireless device over any standard time window does not exceed the standard radio frequency exposure value. The power back-off amount threshold is appropriately set as it is set in advance according to an actual application scenario, and therefore communication performance of the wireless device is not affected, and applicability is good.

With reference to the first aspect, in a third possible implementation of the first aspect, the obtaining an average radio frequency exposure value over a target time window includes: obtaining one or more first real-time transmit powers, where the first real-time transmit power is a real-time transmit power of the wireless device that is obtained in a preset period over the target time window; determining a first quantity, where the first quantity is a quantity of the obtained first real-time transmit powers; determining a first real-time radio frequency exposure value corresponding to each of the first real-time transmit powers; generating a first addition value, where the first addition value is a value obtained by adding all the first real-time radio frequency exposure values; and generating the average radio frequency exposure value, where the average radio frequency exposure value is a ratio of the first addition value to the first quantity.

In this implementation, a plurality of real-time transmit powers of the wireless device are obtained in the preset period over the target time window, a real-time radio frequency exposure value corresponding to each of the real-time transmit powers is determined, an average value of the plurality of real-time radio frequency exposure values is calculated, and the average value is determined as the average radio frequency exposure value over the target time window. In this process, duration of the preset period may be set according to requirements of an actual application scenario. If the actual application scenario has a high requirement on precision of radio frequency exposure control, the duration of the preset period may be set to be shorter. If the actual application scenario has a low requirement on precision of radio frequency exposure control, the duration of the preset period may be set to be longer. Therefore, control flexibility is higher and applicability is better.

With reference to the first aspect, in a fourth possible implementation of the first aspect, the obtaining an average radio frequency exposure value over a target time window includes: dividing the target time window into at least two time sub-windows; obtaining a second real-time transmit power, where the second real-time transmit power is a real-time transmit power of the wireless device that is obtained in each of the time sub-windows; determining a second quantity, where the second quantity is a quantity of the time sub-windows; determining a second real-time radio frequency exposure value corresponding to each of the second real-time transmit powers; generating a second addition value, where the second addition value is a value obtained by adding all the second real-time radio frequency exposure values; and generating the average radio frequency exposure value, where the average radio frequency exposure value is a ratio of the second addition value to the second quantity.

In this implementation, the target time window is divided into at least two time sub-windows, a real-time transmit power is randomly obtained in each of the time sub-windows, a real-time radio frequency exposure value corresponding to each of the real-time transmit powers is determined, an average value of all the real-time radio frequency exposure values is calculated, and the average value is determined as the average radio frequency exposure value over the target time window. The process of obtaining the average radio frequency exposure value is simpler, and therefore efficiency of subsequent radio frequency exposure control can be improved.

With reference to the first aspect, in a fifth possible implementation of the first aspect, the obtaining an average radio frequency exposure value over a target time window includes: dividing the target time window into at least two time sub-windows; obtaining a sub-window average radio frequency exposure value over each of the time sub-windows; determining a second quantity, where the second quantity is a quantity of the time sub-windows; generating a third addition value, where the third addition value is a value obtained by adding all the sub-window average radio frequency exposure values; and generating the average radio frequency exposure value, where the average radio frequency exposure value is a ratio of the third addition value to the second quantity.

In this implementation, the target time window is divided into at least two time sub-windows, then a sub-window average radio frequency exposure value over each of the time sub-windows is calculated, and finally the average value of all the sub-window average radio frequency exposure values is calculated, and the average value is determined as the average radio frequency exposure value over the target time window. In this way, the obtained average radio frequency exposure value has higher accuracy, and therefore subsequent radio frequency exposure control accordingly has higher accuracy.

According to a second aspect, an embodiment of this application provides an apparatus for controlling radio frequency exposure of a wireless device. The apparatus includes: an obtaining module, configured to obtain an average radio frequency exposure value over a target time window, where the target time window is a standard time window; a determining module, configured to determine a power threshold corresponding to the average radio frequency exposure value, where the power threshold is a preset power value corresponding to a preset value range to which the average radio frequency exposure value belongs; and a processing module, configured to control a transmit power of the wireless device based on the power threshold over a controlled time window, where a start moment of the controlled time window is an end moment of the target time window, and duration of the controlled time window is shorter than duration of the standard time window.

After the controlling starts, the apparatus provided in this implementation first obtains the average radio frequency exposure value over the target time window corresponding to the controlled time window, then determines the power threshold corresponding to the average radio frequency exposure value, and finally, controls the transmit power of the wireless device based on the power threshold over the controlled time window. Because the power threshold is set according to an actual application scenario, the wireless device operates based on the corresponding power threshold in any controlled time window, and therefore it can be ensured that an average radio frequency exposure value of the wireless device over any standard time window does not exceed a standard radio frequency exposure value. In addition, when the power threshold is appropriately set, communication performance of the wireless device is not affected. Moreover, the power threshold may be determined based on a preset correspondence between a preset value range of an average radio frequency exposure value and a preset power value, without requiring real-time calculation. Therefore, a calculation amount is smaller, and radio frequency exposure control efficiency is higher.

With reference to the second aspect, in a first possible implementation of the second aspect, the power threshold is a transmit power threshold. The processing module is specifically configured to adjust an actual transmit power of the wireless device over the controlled time window, so that the actual transmit power is less than or equal to the transmit power threshold.

The apparatus provided in this implementation can determine a transmit power threshold corresponding to each controlled time window, and only needs to control the actual transmit power of the wireless device to be within the corresponding transmit power threshold in each controlled time window. In this way, it can be ensured that an average radio frequency exposure value of the wireless device over any standard time window does not exceed the standard radio frequency exposure value. Therefore, the control process is simpler, and control efficiency is higher.

With reference to the second aspect, in a second possible implementation of the second aspect, the power threshold is a power back-off amount threshold. The processing module is specifically configured to: control, over the controlled time window, the wireless device to perform transmit power back-off based on a target power back-off amount, where the target power back-off amount is greater than or equal to the power back-off amount threshold.

The apparatus provided in this implementation can determine a power back-off amount threshold corresponding to each controlled time window based on a preset correspondence between a preset value range of an average radio frequency exposure value and a preset power value, and perform transmit power back-off on the wireless device based on the corresponding power back-off amount threshold only in each controlled time window. In this way, it can be ensured that an average radio frequency exposure value of the wireless device over any standard time window does not exceed the standard radio frequency exposure value. The power back-off amount threshold is appropriately set as it is set in advance according to an actual application scenario, and therefore communication performance of the wireless device is not affected, and applicability is good.

With reference to the second aspect, in a third possible implementation of the second aspect, the obtaining module is specifically configured to: obtain one or more first real-time transmit powers, where the first real-time transmit power is a real-time transmit power of the wireless device that is obtained in a preset period over the target time window; determine a first quantity, where the first quantity is a quantity of the obtained first real-time transmit powers; determine a first real-time radio frequency exposure value corresponding to each of the first real-time transmit powers; generate a first addition value, where the first addition value is a value obtained by adding all the first real-time radio frequency exposure values; and generate the average radio frequency exposure value, where the average radio frequency exposure value is a ratio of the first addition value to the first quantity.

The apparatus provided in this implementation obtains a plurality of real-time transmit powers of the wireless device in the preset period over the target time window, determines a real-time radio frequency exposure value corresponding to each of the real-time transmit powers, calculates an average value of the plurality of real-time radio frequency exposure values, and determines the average value as the average radio frequency exposure value over the target time window. Based on this, duration of the preset period may be set according to requirements of an actual application scenario. If the actual application scenario has a high requirement on precision of radio frequency exposure control, the duration of the preset period may be set to be shorter. If the actual application scenario has a low requirement on precision of radio frequency exposure control, the duration of the preset period may be set to be longer. Therefore, control flexibility is higher and applicability is better.

With reference to the second aspect, in a fourth possible implementation of the second aspect, the obtaining module is specifically configured to: divide the target time window into at least two time sub-windows; obtain a second real-time transmit power, where the second real-time transmit power is a real-time transmit power of the wireless device that is obtained in each of the time sub-windows; determine a second quantity, where the second quantity is a quantity of the time sub-windows; determine a second real-time radio frequency exposure value corresponding to each of the second real-time transmit powers; generate a second addition value, where the second addition value is a value obtained by adding all the second real-time radio frequency exposure values; and generate the average radio frequency exposure value, where the average radio frequency exposure value is a ratio of the second addition value to the second quantity.

The apparatus provided in this implementation divides the target time window at least two time sub-windows, randomly obtains a real-time transmit power m each of the time sub-windows, determines a real-time radio frequency exposure value corresponding to each real-time transmit power, calculates an average value of all the real-time radio frequency exposure values, and determines the average value as the average radio frequency exposure value over the target time window. The process of obtaining the average radio frequency exposure value is simpler, and efficiency of subsequent radio frequency exposure control can be improved.

With reference to the second aspect, in a fifth possible implementation of the second aspect, the obtaining module is specifically configured to: divide the target time window into at least two time sub-windows; obtain a sub-window average radio frequency exposure value over each of the time sub-windows; determine a second quantity, where the second quantity is a quantity of the time sub-windows; generate a third addition value, where the third addition value is a value obtained by adding all the sub-window average radio frequency exposure values, and generate the average radio frequency exposure value, where the average radio frequency exposure value is a ratio of the third addition value to the second quantity.

The apparatus provided in this implementation divides the target time window into at least two time sub-windows, then calculates the sub-window average radio frequency exposure value over each of the time sub-windows, and finally calculates the average value of all the sub-window average radio frequency exposure values, and determines the average value as the average radio frequency exposure value over the target time window. In this way, the obtained average radio frequency exposure value has higher accuracy, and therefore subsequent radio frequency exposure control accordingly has higher accuracy.

According to a third aspect, an embodiment of this application provides a wireless device. The wireless device includes the apparatus for controlling radio frequency exposure of the wireless device according to any one of the second aspect or the possible implementations of the second aspect.

According to a fourth aspect, an embodiment of this application provides an apparatus. The apparatus includes a processor, and the processor is configured to be coupled to a memory, read instructions from the memory, and perform, according to the instructions, the method for controlling radio frequency exposure of a wireless device according to any one of the first aspect or the possible implementations of the first aspect.

According to a fifth aspect, an embodiment of this application provides a computer storage medium. The computer storage medium stores instructions. When the instructions are run on a computer, the computer is enabled to perform some or all steps of the method for controlling radio frequency exposure of a wireless device according to any one of the first aspect or the possible implementations of the first aspect.

According to a sixth aspect, an embodiment of this application provides a computer program product. When the computer program product runs on a computer, the computer performs some or all of the steps of the method for controlling radio frequency exposure of a wireless device according to any one of the first aspect or the possible implementations of the first aspect.

To resolve the existing problem that using the existing method for controlling radio frequency exposure of the wireless device greatly affects communication performance of the wireless device, embodiments of this application provide the method and apparatus for controlling radio frequency exposure of the wireless device, and the wireless device. In the method for controlling radio frequency exposure, after controlling starts, the average radio frequency exposure value over the target time window corresponding to each controlled time window is first obtained, then the power threshold corresponding to the average radio frequency exposure value is determined, and finally the transmit power of the wireless device is controlled based on the power threshold over the controlled time window. Because the power threshold is set according to an actual application scenario, the wireless device operates based on the corresponding power threshold in any controlled time window, and therefore it can be ensured that an average radio frequency exposure value of the wireless device over any standard time window does not exceed the standard radio frequency exposure value. In addition, when the power threshold is appropriately set, communication performance of the wireless device is not affected. Moreover, the power threshold may be determined based on the preset correspondence between a preset value range of an average radio frequency exposure value and a preset power value, without requiring real-time calculation. Therefore, the calculation amount is smaller, and radio frequency exposure control efficiency is higher.

DESCRIPTION OF EMBODIMENTS

The following describes the technical solutions of this application with reference to the accompanying drawings.

Before the technical solutions of this application are described, technical scenarios of this application are first described with reference to the accompanying drawings.

A wireless device may receive and transmit a radio frequency signal using a radio frequency (radio frequency, RF) circuit disposed inside, to implement wireless communication with another device. In embodiments of this application, the wireless device may be a mobile phone, a smartphone, a tablet computer, a personal digital assistant, a router, a media player, or the like. In a process in which the wireless device receives or transmits a radio frequency signal, radio frequency radiation (radio frequency radiation, RFR) is caused. Radio frequency radiation is electromagnetic radiation at a frequency of 100 KHz to 300 GHz. High radio frequency radiation energy may damage the human body if it is incident to the human body. To avoid this, various countries and regions have developed related standards and guidelines for radio frequency radiation of wireless devices, to specify a radio frequency exposure value used for measuring radio frequency radiation energy of wireless devices that an average radio frequency exposure value of a wireless device over any fixed duration (for example, 6 minutes) shall not exceed a standard-specified maximum radio frequency exposure value.

It should be noted that, for ease of subsequent description, in this application, the fixed duration specified in related radio frequency radiation standards for wireless devices is briefly referred to as a standard time window. Because fixed duration specified in different standards is different, duration of standard time windows corresponding to different standards is accordingly different. In addition, in this application, a maximum radio frequency exposure value specified in related radio frequency radiation standards for wireless devices is briefly referred to as a standard radio frequency exposure value.

Different radio frequency exposure values are usually used to measure radio frequency radiation energy for radio frequency radiation at different frequency bands. For example, for radio frequency radiation at frequency bands less than 6 GHz, a specific absorption ratio (specific absorption ratio, SAR) is usually used as a radio frequency exposure value to measure radio frequency radiation energy incident to a human body. The SAR is a measure of the rate at which electromagnetic radiation energy is absorbed per unit mass in a unit time, and has units of watts per kilogram (W/Kg). For example, the Federal Communications Commission FCC's related radio frequency exposure standards for wireless devices specify that an SAR averaged over any 6-minute standard time window shall not exceed 1.6 W/Kg. The European Community CE's related radio frequency exposure standards for wireless devices specify that an SAR value averaged over any 6-minute standard time window shall not exceed 2 W/Kg.

For radio frequency radiation at frequency bands greater than or equal to 6 GHz, a free space power density value (MPE) is used as a radio frequency exposure value to measure radio frequency radiation energy incident to a human body. The MPE refers to near-field power density per averaged area in a specific region, and has units of watts per square meter (W/m$^2$). For example, the Federal Communications Commission FCC's related radio frequency exposure standards for wireless devices specify that an MPE value averaged over an area in a given distance for radiation of a wireless device in free space shall not exceed 10 W/m$^2$.

In addition, in an application scenario in which there is both radio frequency radiation at a frequency band less than 6 GHz and radio frequency radiation at a frequency band greater than or equal to 6 GHz, a total exposure ratio may be used as a radio frequency exposure value to measure radio frequency radiation energy incident to a human body. The total exposure ratio is a sum of results obtained by performing normalization of the standard radio frequency exposure values on the SAR and MPE values respectively. The value of the total exposure ratio shall be less than or equal to 1, so that a human body can be free from radio frequency radiation energy.

It can be learned from the calculation formula $$SAR = \frac{\sigma_g E^2}{\rho}$$

of the SAR value that, $\sigma$ represents a conductivity of an absorber (for example, an absorber simulating a tissue of a human body), $\rho$ represents a mass density of the absorber, and E represents a variance of an electric field strength caused when a wireless device generates a radio frequency signal. It can be learned that the SAR value is related to the electric field strength caused by the radio frequency signal generated by the wireless device. In addition, the MPE value is also related to the electric field strength caused when the wireless device generates a radio frequency signal. The electric field strength caused when the wireless device generates a radio frequency signal is related to a transmit power of the wireless device. Based on this, to ensure that an average radio frequency exposure value of the wireless device over any standard time window does not exceed the standard radio frequency exposure value, radio frequency exposure of the wireless device is usually controlled by controlling the transmit power of the wireless device in the conventional technology.

The following describes several manners of controlling radio frequency exposure of a wireless device in the conventional technology.

Manner 1: Radio frequency exposure of the wireless device is controlled in the following manner: obtaining an actual transmit power of the wireless device; determining an actual radio frequency exposure value corresponding to the actual transmit power; if the actual radio frequency exposure value is greater than a standard radio frequency exposure value, obtaining a power back-off amount, where the power back-off amount is a difference between the actual transmit power and a standard transmit power, and the standard transmit power is a transmit power corresponding to the standard radio frequency exposure value, and performing power back-off on the wireless device based on the power back-off amount.

Using this manner to control radio frequency exposure of the wireless device affects communication performance of the wireless device and even causes communication interruption when the power back-off amount is a large value.

Manner 2: To minimize impact on communication performance of the wireless device, radio frequency exposure of the wireless device is controlled in the following manner: obtaining an actual transmit power of the wireless device; determining an actual radio frequency exposure value corresponding to the actual transmit power; if the actual radio frequency exposure value is greater than a standard radio frequency exposure value, obtaining a distance between a user and a wireless device; if the distance is less than or equal to a preset threshold, obtaining a power back-off amount, where the power back-off amount is a difference between the actual transmit power and a standard transmit power, and the standard transmit power is a transmit power corresponding to the standard radio frequency exposure value; and performing power back-off on the wireless device based on the power back-off amount.

In this manner, power back-off is performed on the wireless device only when the user is close to the wireless device and the actual radio frequency exposure value of the wireless device is greater than the standard radio frequency exposure value. This greatly reduces the impact on communication performance of the wireless device, but cannot completely eliminate the impact of power back-off on the communication performance of the wireless device.

Manner 3: Radio frequency exposure of the wireless device is controlled in the following manner: obtaining an average radio frequency exposure value over a target time window, where the target time window is a standard time window; calculating a radio frequency exposure value margin, where the radio frequency exposure value margin is a difference between the standard radio frequency exposure value and the average radio frequency exposure value; determining a transmit power threshold corresponding to the radio frequency exposure value margin; and performing sending over a controlled time window based on a transmit power that is less than or equal to the transmit power threshold, where a start moment of the controlled time window is an end moment of the target time window, and duration of the controlled time window is shorter than duration of the standard time window.

In this manner, the radio frequency exposure value margin needs to be calculated in real time based on the target time window corresponding to the controlled time window, causing a large amount of calculation. Consequently, control efficiency is low.

In conclusion, it can be learned that some of the existing methods for controlling radio frequency exposure of the wireless device greatly affect communication performance of the wireless device, and some of the methods require a large amount of calculation and have low controlling efficiency. The methods all have poor applicability. To resolve the problems in the existing technologies, embodiments of this application provide a method and an apparatus for controlling radio frequency exposure of a wireless device, and the wireless device.

The following describes embodiments of a method for controlling radio frequency exposure of a wireless device provided in this application.

Figure 1:
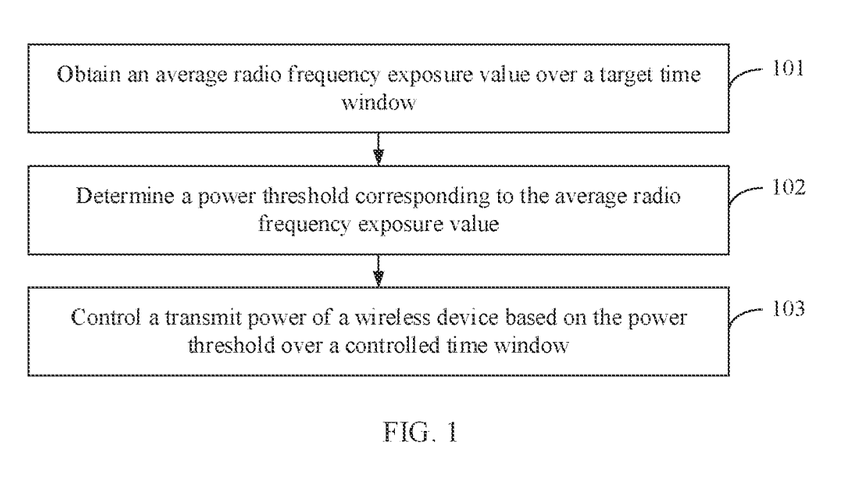
FIG. 1 is a schematic flowchart of an implementation of a method for controlling radio frequency exposure of a wireless device according to this application.

FIG. 1 is a schematic flowchart of an implementation of a method for controlling radio frequency exposure of a wireless device according to this application. With reference to FIG. 1, it can be learned that the method for controlling radio frequency exposure includes the following steps.

Step 101: Obtain an average radio frequency exposure value over a target time window.

In the method for controlling radio frequency exposure provided in this embodiment of this application, after radio frequency exposure control starts, radio frequency exposure of the wireless device is controlled based on a controlled time window, where there is at least one controlled time window. When there are a plurality of controlled time windows, in two adjacent controlled time windows, an end moment of a previous controlled time window is a start moment of a current controlled time window, duration of each controlled time window is shorter than duration of a standard time window, and duration of different controlled time windows may be the same or different.

It should be noted that a trigger condition for starting the radio frequency exposure control may be a moment at which the wireless device is powered on, or a moment at which the wireless device detects that a user approaches, or the like. This is not limited in this application.

Before control of radio frequency exposure of the wireless device in each controlled time window, an average radio frequency exposure value over the target time window corresponding to the controlled time window is first obtained. Duration of the target time window is equal to duration of the standard time window, that is, each target time window is a standard time window. An end moment of a target time window corresponding to each controlled time window is a start moment of the controlled time window. In other words, the target time window corresponding to each controlled time window is actually a standard time window in which a previous controlled time window of the controlled time window is located.

Figure 2:
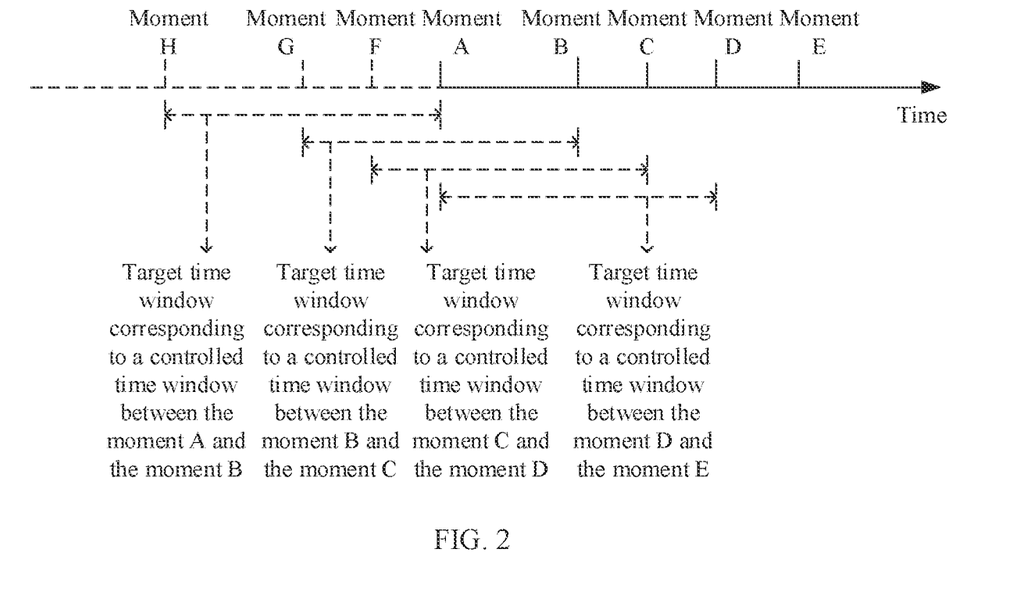
FIG. 2 is a schematic diagram of an application scenario according to this application.

For a specific relationship between the controlled time window and the target time window, refer to FIG. 2. FIG. 2 is a schematic diagram of an application scenario according to this application. As shown in FIG. 2, a moment A in FIG. 2 represents a moment at which radio frequency exposure control starts, and a time period from the moment A to a moment B, a time period from the moment B to a moment C, a time period from the moment C to a moment D, and a time period from the moment D to a moment E each constitute a controlled time window. A target time window corresponding to the controlled time window between the moment A and the moment B is a time period between a moment H and the moment A. A target time window corresponding to the controlled time window between the moment B and the moment C is a time period between a moment G and the moment B. A target time window corresponding to the controlled time window between the moment C and the moment D is a time period between a moment F and the moment C. A target time window corresponding to the controlled time window between the moment D and the moment E is a time period between the moment A and the moment D. For a relationship between each controlled time window after the moment E and a target time window corresponding to the controlled time window, refer to the foregoing relationship between the controlled time window and the target time window corresponding to the controlled time window. This is not enumerated herein one by one. Duration of each target time window is equal to duration of the standard time window, for example, 6 minutes.

Because the moment A is the moment at which the radio frequency exposure control starts, an average radio frequency exposure value over the target time window corresponding to the controlled time window between the moment A and the moment B is zero. An average radio frequency exposure value over the target time window corresponding to the controlled time window between the moment B and the moment C is an average value of radio frequency exposure values in the time period between the moment A and the moment B. An average radio frequency exposure value over the target time window corresponding to the controlled time window between the moment C and the moment D is an average value of radio frequency exposure values in the time period between the moment A and the moment C. An average radio frequency exposure value over a target time window corresponding to each controlled time window after the moment D is an average value of radio frequency exposure values in a time period corresponding to the target time window.

The average radio frequency exposure value over the target time window may be obtained in a plurality of implementations.

Figure 3:
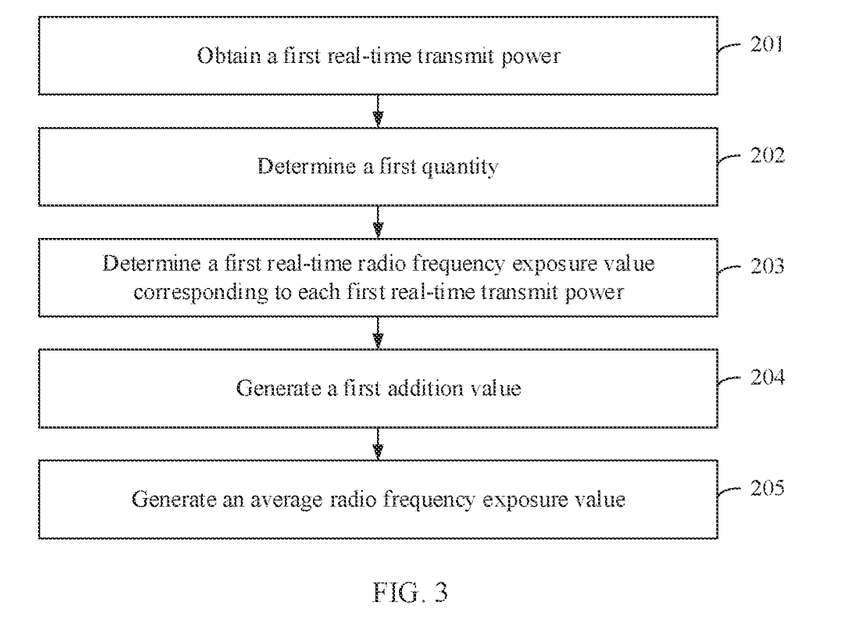
FIG. 3 is a schematic flowchart of an implementation of a method for obtaining an average radio frequency exposure value over a target time window according to this application.

For a first implementation, refer to FIG. 3. FIG. 3 is a schematic flowchart of an implementation of the method for obtaining an average radio frequency exposure value over a target time window according to this application. With reference to FIG. 3, it can be learned that the average radio frequency exposure value over the target time window may be obtained in the following steps.

Step 201: Obtain a first real-time transmit power.

The first real-time transmit power is a real-time transmit power of the wireless device that is obtained in a preset period over the target time window. The preset period may be set according to an actual application scenario. Setting a shorter duration of the preset period helps obtain a more accurate average radio frequency exposure value over the obtained target time window, so that a higher precision can be obtained for subsequent control of radio frequency exposure of the wireless device based on the average radio frequency exposure value. This ensures that the average radio frequency exposure value of the wireless device over any standard time window does not exceed the standard radio frequency exposure value. Based on this, the preset period may be set to relatively long duration for an application scenario with a low precision requirement, and the preset period may be set to relatively short duration for an application scenario with a high precision requirement.

Step 202: Determine a first quantity.

The first quantity is a quantity of obtained first real-time transmit powers.

Step 203: Determine a first real-time radio frequency exposure value corresponding to each of the first real-time transmit powers.

There is a system-preset correspondence between a real-time transmit power and a real-time radio frequency exposure value of the wireless device. Step 203 may be specifically performed as follows: determining, based on the system-preset correspondence between a real-time transmit power and a real-time radio frequency exposure value of the wireless device, the first real-time radio frequency exposure value corresponding to each of the first real-time transmit powers.

Step 204: Generate a first addition value.

The first addition value is a value obtained by adding all the first real-time radio frequency exposure values.

Step 205: Generate an average radio frequency exposure value.

The average radio frequency exposure value is a ratio of the first addition value to the first quantity.

Figure 4:
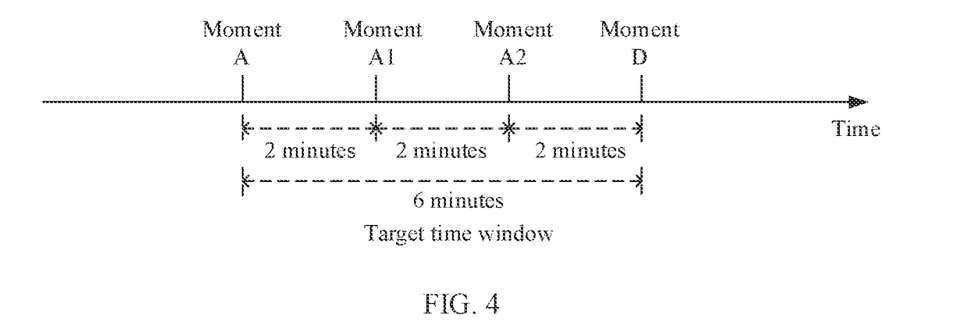
FIG. 4 is a schematic diagram of another application scenario according to this application.

The method shown in FIG. 3 is described below by using the target time window between the moment A and the moment D as an example. As shown in FIG. 4, assuming that the duration of the standard time window is 6 minutes and the preset period is 2 minutes, duration of the target time window between the moment A and the moment D is also 6 minutes. In the target time window between the moment A and the moment D, a first real-time transmit power P1 may be obtained at the moment A, a first real-time transmit power P2 may be obtained at a moment A1, and a first real-time transmit power P3 may be obtained at a moment A2. There is a 2-minute interval between the moment A and the moment A1, between the moment A1 and the moment A2, and between the moment A2 and the moment D. In other words, three first real-time transmit powers are obtained over the target time window between the moment A and the moment D. Therefore, a value of the first quantity is 3. It can be learned, based on the system-preset correspondence between a real-time transmit power of the wireless device and a real-time radio frequency exposure value, that a first real-time radio frequency exposure value corresponding to P1 is S1, a first real-time radio frequency exposure value corresponding to P2 is S2, and a first real-time radio frequency exposure value corresponding to P3 is S3, and therefore the first addition value is S1+S2+S3. Therefore, an average radio frequency exposure value over the target time window between the moment A and the moment D may be calculated as (S1+S2+S3)/3.

Figure 5:
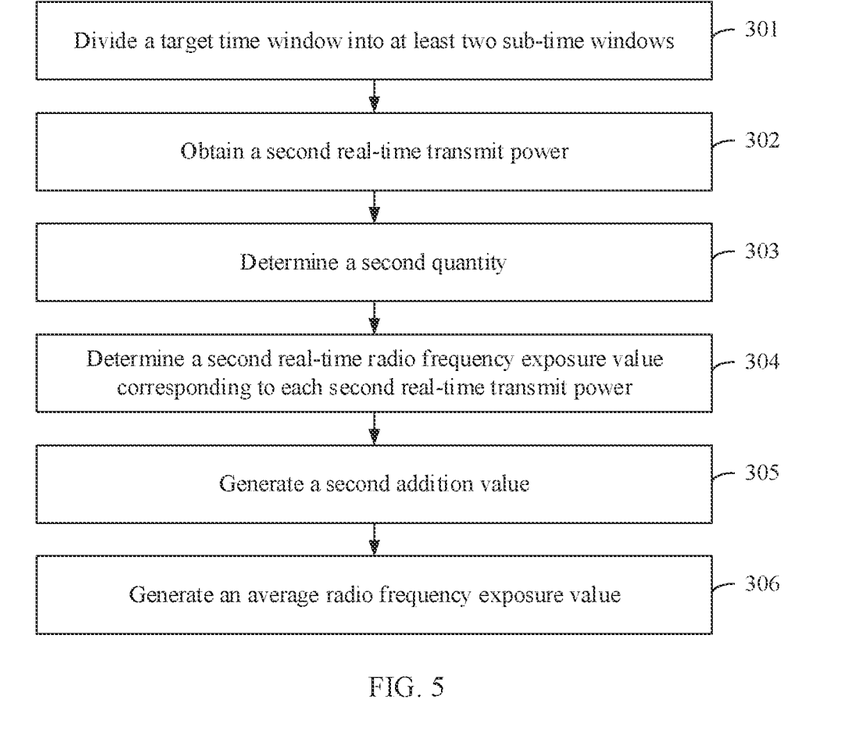
FIG. 5 is a schematic flowchart of another implementation of a method for obtaining an average radio frequency exposure value over a target time window according to this application.

For a second implementation, refer to FIG. 5. FIG. 5 is a schematic flowchart of another implementation of the method for obtaining an average radio frequency exposure value over a target time window according to this application. With reference to FIG. 5, it can be learned that the average radio frequency exposure value over the target time window may alternatively be obtained in the following steps.

Step 301: Divide the target time window into at least two time sub-windows.

After the target time window is divided into at least two time sub-windows, a start moment of the first time sub-window is a start moment of the target time window, and an end moment of the last time sub-window is an end moment of the target time window. In two adjacent time sub-windows, an end moment of a previous time sub-window is a start moment of a current time sub-window, and duration of different time sub-windows may be the same or different.

Step 302: Obtain a second real-time transmit power.

The second real-time transmit power is a real-time transmit power of the wireless device that is obtained in each time sub-window. In each time sub-window, a real-time transmit power of the wireless device obtained at any moment in the time sub-window may be determined as the second real-time transmit power obtained in the time sub-window.

Step 303: Determine a second quantity.

The second quantity is a quantity of the time sub-windows.

Step 304: Determine a second real-time radio frequency exposure value corresponding to each of the second real-time transmit powers.

Step 304 may be specifically performed as follows: determining, based on a system-preset correspondence between a real-time transmit power of the wireless device and a real-time radio frequency exposure value, the second real-time radio frequency exposure value corresponding to each of the second real-time transmit powers.

Step 305: Generate a second addition value.

The second addition value is a value obtained by adding all the second real-time radio frequency exposure values.

Step 306: Generate an average radio frequency exposure value.

The average radio frequency exposure value is a ratio of the second addition value to the second quantity.

Figure 6:
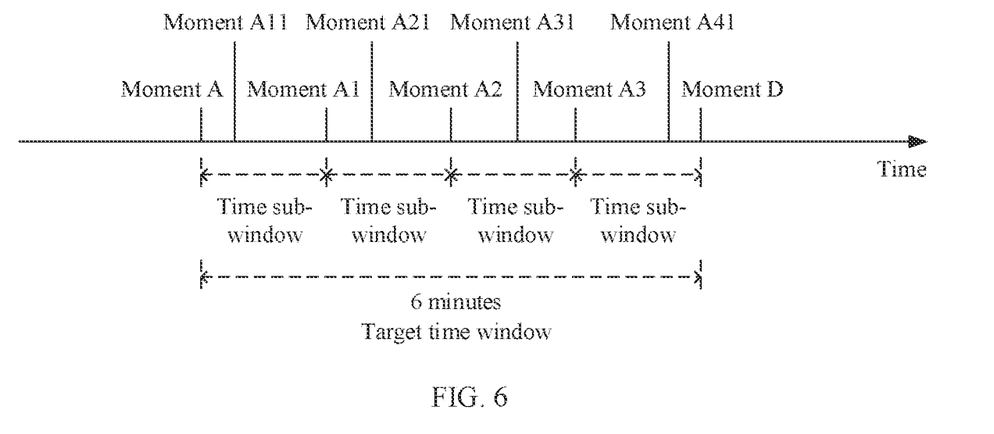
FIG. 6 is a schematic diagram of another application scenario according to this application.

The method shown in FIG. 5 is described below still by using the target time window between the moment A and the moment D as an example. As shown in FIG. 6, assuming that the duration of the standard time window is 6 minutes, duration of the target time window between the moment A and the moment D is also 6 minutes. The target time window between the moment A and the moment D is divided into four time sub-windows; a time sub-window between the moment A and a moment A1, a time sub-window between the moment A1 and a moment A2, a time sub-window between the moment A2 and a moment A3, and a time sub-window between the moment A3 and the moment D, A moment A11 is located between the moment A and the moment A1, a moment A21 is located between the moment A1 and the moment A2, a moment A31 is located between the moment A2 and the moment A3, and a moment A41 is located between the moment A3 and the moment D. Second real-time transmit powers P1, P2, P3, and P4 are respectively obtained at the moment A11, the moment A21, the moment A31, and the moment A41, and a value of the second quantity is 4. It can be learned, based on the system-preset correspondence between a real-time transmit power of the wireless device and a real-time radio frequency exposure value, a second real-time radio frequency exposure value corresponding to P1 is S1, a second real-time radio frequency exposure value corresponding to P2 is S2, a second real-time radio frequency exposure value corresponding to P3 is S3, and a second real-time radio frequency exposure value corresponding to P4 is S4, and therefore the second addition value is S1+S2+S3+S4. Therefore, the average radio frequency exposure value over the target time window between the moment A and the moment D is calculated as: (S1+S2+S3+S4)/4.

Figure 7:
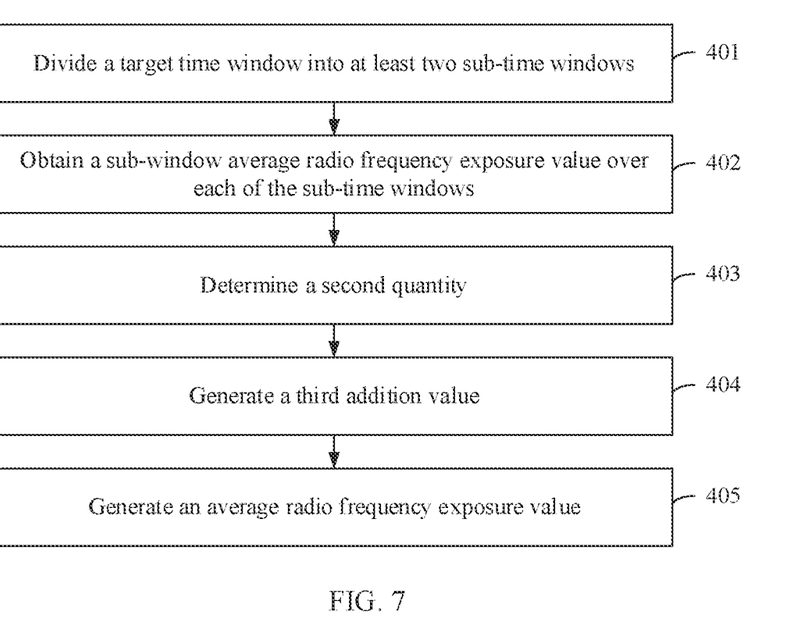
FIG. 7 is a schematic flowchart of another implementation of a method for obtaining an average radio frequency exposure value over a target time window according to this application.

For a third implementation, refer to FIG. 7. FIG. 7 is a schematic flowchart of another implementation of the method for obtaining an average radio frequency exposure value over a target time window according to this application. With reference to FIG. 7, it can be learned that the average radio frequency exposure value over the target time window may alternatively be obtained in the following steps.

Step 401: Divide the target time window into at least two time sub-windows.

For a specific implementation of step 401, refer to step 301 in the embodiment shown in FIG. 5. Details are not described herein again.

Step 402: Obtain a sub-window average radio frequency exposure value over each of the time sub-windows.

The sub-window average radio frequency exposure value over each time sub-window is an average radio frequency exposure value in a time period corresponding to the time sub-window. For a specific implementation of obtaining the sub-window average radio frequency exposure value over each time sub-window, refer to the method shown in FIG. 3. Details are not described herein again.

Step 403: Determine a second quantity.

The second quantity is a quantity of the time sub-windows.

Step 404: Generate a third addition value.

The third addition value is a value obtained by adding all the sub-window average radio frequency exposure values.

Step 405: Generate an average radio frequency exposure value.

The average radio frequency exposure value is a ratio of the third addition value to the second quantity.

Figure 8:
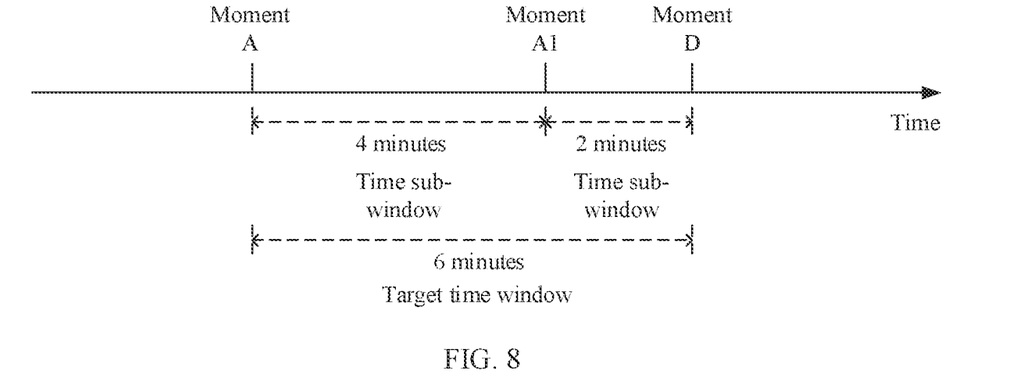
FIG. 8 is a schematic diagram of another application scenario according to this application.

The method shown in FIG. 7 is described below still by using the target time window between the moment A and the moment D as an example. As shown in FIG. 8, assuming that the duration of the standard time window is 6 minutes, duration of the target time window between the moment A and the moment D is also 6 minutes. The target time window between the moment A and the moment D is divided into two time sub-windows: a 4-minute time sub-window between the moment A and a moment A1, and a 2-minute time sub-window between the moment A1 and the moment D. In this case, a value of the second quantity is 2.

According to the method shown in FIG. 3, in the time sub-window between the moment A and the moment A1, a real-time transmit power is obtained every minute, and four real-time transmit powers are obtained in total. Real-time radio frequency exposure values corresponding to the four real-time transmit powers are S1, S2, S3, and S4, and therefore a sub-window average radio frequency exposure value over the time sub-window between the moment A and the moment A1 is calculated as: S11=(S1+S2+S3+S4)/4. Similarly, it can be learned that, a sub-window average radio frequency exposure value over the time sub-window between the moment A1 and the moment D is S22, and therefore the third addition value is S11+S22. Therefore, an average radio frequency exposure value over the target time window between the moment A and the moment D may be calculated as: (S11+S22)/2.

Step 102: Determine a power threshold corresponding to the average radio frequency exposure value.

In the method for controlling radio frequency exposure provided in this embodiment of this application, before radio frequency exposure control starts, a plurality of thresholds for the average radio frequency exposure value are set based on an actual application scenario, and then a plurality of preset value ranges of the average radio frequency exposure value are obtained through division based on the plurality of thresholds for the average radio frequency exposure value. A corresponding preset power value is set for each preset value range, and then a correspondence between the preset value range of the average radio frequency exposure value and the preset power value is stored in a system of the wireless device, so that the correspondence can be invoked directly from the system of the wireless device when radio frequency exposure of the wireless device is controlled.

The preset power value corresponding to the preset value range may be obtained through repeated trials in an actual application scenario. Specifically, a plurality of standard time windows may be randomly selected, that is, a plurality of time periods may be randomly selected, and a start moment and an end moment of each time period may be arbitrarily set, provided that duration of each time segment is equal to the duration of the standard time window. The preset power value corresponding to each preset value range that meets the current application scenario may be obtained through repeated trials for a plurality of times. In this way, the wireless device subsequently controls its transmit power in each controlled time window based on a preset power value corresponding to each preset value range, to ensure that an average radio frequency exposure value in any standard time window does not exceed the standard radio frequency exposure value.

Based on this, determining the power threshold corresponding to the average radio frequency exposure value may be implemented in the following manner: determining a preset value range to which the average radio frequency exposure value belongs; determining a preset power value corresponding to the preset value range, and determining the preset power value as the power threshold corresponding to the average radio frequency exposure value.

The power threshold may be a transmit power threshold, or may be a power back-off amount threshold.

Step 103: Control a transmit power of the wireless device based on the power threshold over a controlled time window.

After the average radio frequency exposure value over the target time window corresponding to each controlled time window is obtained, and the power threshold corresponding to the average radio frequency exposure value is determined, the transmit power of the wireless device may be controlled based on the power threshold over the controlled time window. Therefore, the average radio frequency exposure value of the wireless device over any standard time window does not exceed the standard radio frequency exposure value.

When the power threshold is a transmit power threshold, the controlling a transmit power of the wireless device based on the power threshold over a controlled time window includes: adjusting an actual transmit power of the wireless device over the controlled time window, so that an actual transmit power of the wireless device is less than or equal to the transmit power threshold.

When the power threshold is a power back-off amount threshold, the controlling a transmit power of the wireless device based on the power threshold over a controlled time window specifically includes: controlling, over the controlled time window, the wireless device to perform transmit power back-off based on a target power back-off amount, where the target power back-off amount is greater than or equal to the power back-off amount threshold.

In the method for controlling radio frequency exposure of a wireless device provided in this embodiment of this application, after the controlling starts, the average radio frequency exposure value over the target time window corresponding to each controlled time window is first obtained, then the power threshold corresponding to the average radio frequency exposure value is determined, and finally, the transmit power of the wireless device is controlled based on the power threshold over the controlled time window. Because the power threshold is set according to an actual application scenario, the wireless device operates based on the corresponding power threshold in any controlled time window, and therefore it can be ensured that an average radio frequency exposure value of the wireless device over any standard time window does not exceed the standard radio frequency exposure value. In addition, when the power threshold is appropriately set, communication performance of the wireless device is not affected. Moreover, the power threshold may be determined based on a preset correspondence between a preset value range of an average radio frequency exposure value and a preset power value, without requiring real-time calculation. Therefore, a calculation amount is smaller, and radio frequency exposure control efficiency is higher.

The following describes apparatus embodiments corresponding to the foregoing method embodiments.

Figure 9:
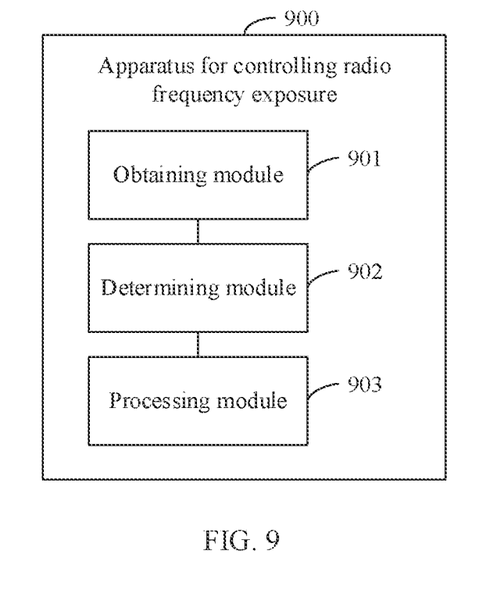
FIG. 9 is a block diagram depicting a structure of an implementation of an apparatus for controlling radio frequency exposure of a wireless device according to this application.

FIG. 9 is a block diagram depicting a structure of an implementation of an apparatus for controlling radio frequency exposure of a wireless device according to this application. With reference to FIG. 9, it can be learned that the apparatus 900 for controlling radio frequency exposure includes:

an obtaining module 901, configured to obtain an average radio frequency exposure value over a target time window, where the target time window is a standard time window: a determining module 902, configured to determine a power threshold corresponding to the average radio frequency exposure value, where the power threshold is a preset power value corresponding to a preset value range to which the average radio frequency exposure value belongs; and a processing module 903, configured to control a transmit power of the wireless device based on the power threshold over a controlled time window, where a start moment of the controlled time window is an end moment of the target time window, and duration of the controlled time window is shorter than duration of the standard time window.

After the controlling starts, the apparatus for controlling radio frequency exposure provided in this embodiment of this application first obtains the average radio frequency exposure value over the target time window corresponding to the controlled time window, then determines the power threshold corresponding to the average radio frequency exposure value, and finally, controls the transmit power of the wireless device based on the power threshold over the controlled time window. Because the power threshold is set according to an actual application scenario, the wireless device operates based on the corresponding power threshold in any controlled time window, and therefore it can be ensured that an average radio frequency exposure value of the wireless device over any standard time window does not exceed a standard radio frequency exposure value. In addition, when the power threshold is appropriately set, communication performance of the wireless device is not affected. Moreover, the power threshold may be determined based on a preset correspondence between a preset value range of an average radio frequency exposure value and a preset power value, without requiring real-time calculation. Therefore, a calculation amount is smaller, and radio frequency exposure control efficiency is higher.

Optionally, the power threshold is a transmit power threshold. The processing module 903 is specifically configured to adjust an actual transmit power of the wireless device over the controlled time window, so that the actual transmit power is less than or equal to the transmit power threshold.

Optionally, the power threshold is a power back-off amount threshold. The processing module 903 is specifically configured to control, over the controlled time window, the wireless device to perform transmit power back-off based on a target power back-off amount, where the target power back-off amount is greater than or equal to the power back-off amount threshold.

Optionally, the obtaining module 901 is specifically configured to: obtain one or more first real-time transmit powers, where the first real-time transmit power is a real-time transmit power of the wireless device that is obtained in a preset period over the target time window; determine a first quantity, where the first quantity is a quantity of the obtained first real-time transmit powers; determine a first real-time radio frequency exposure value corresponding to each of the first real-time transmit powers; generate a first addition value, where the first addition value is a value obtained by adding all the first real-time radio frequency exposure values; and generate the average radio frequency exposure value, where the average radio frequency exposure value is a ratio of the first addition value to the first quantity.

Optionally, the obtaining module 901 is specifically configured to: divide the target time window into at least two time sub-windows; obtain a second real-time transmit power, where the second real-time transmit power is a real-time transmit power of the wireless device that is obtained in each of the time sub-windows; determine a second quantity, where the second quantity is a quantity of the time sub-windows; determine a second real-time radio frequency exposure value corresponding to each of the second real-time transmit powers; generate a second addition value, where the second addition value is a value obtained by adding all the second real-time radio frequency exposure values; and generate the average radio frequency exposure value, where the average radio frequency exposure value is a ratio of the second addition value to the second quantity.

Optionally, the obtaining module 901 is specifically configured to: divide the target time window into at least two time sub-windows; obtain a sub-window average radio frequency exposure value over each of the time sub-windows; determine a second quantity, where the second quantity is a quantity of the time sub-windows; generate a third addition value, where the third addition value is a value obtained by adding all the sub-window average radio frequency exposure values; and generate the average radio frequency exposure value, where the average radio frequency exposure value is a ratio of the third addition value to the second quantity.

The apparatus for controlling radio frequency exposure of the wireless device shown in FIG. 9 can implement the method for controlling radio frequency exposure of the wireless device shown in FIG. 1, and achieve same advantageous effects.

During specific implementation, an embodiment of this application further provides a computer storage medium. The computer storage medium may store a program, the program includes instructions. When the program is executed, some or all steps of the method for controlling radio frequency exposure of the wireless device provided in this application are implemented. The computer storage medium may be a magnetic disk, an optical disc, a read-only memory (read-only memory, ROM), a random access memory (random access memory, RAM), or the like.

All or some of the foregoing embodiments may be implemented by using software, hardware, firmware, or any combination thereof. When software is used for implementation, the embodiments may be implemented completely or partially in a form of a computer program product. The computer program product includes one or more computer instructions. When the computer instructions are loaded and executed on a computer, the procedures or the functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

The apparatus for controlling radio frequency exposure of the wireless device, the wireless device, and the computer storage medium are configured to perform some or all steps of the method for controlling radio frequency exposure of the wireless device provided in any embodiment, and correspondingly have advantageous effects of the foregoing method for controlling radio frequency exposure of the wireless device. Details are not described herein again.

It should be understood that, in embodiments of this application, an execution sequence of the steps should be determined based on functions and internal logic of the steps. Sequence numbers of the steps do not mean the execution sequence, and do not constitute any limitation on an implementation process of embodiments.

In addition, in the descriptions of this application, "a plurality of" means two or more than two, unless otherwise specified. In addition, to clearly describe the technical solutions in embodiments of this application, terms such as "first" and "second" are used in embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference.

Embodiments in this specification are all described in a progressive manner. For same or similar parts in embodiments, refer to these embodiments. Each embodiment focuses on a difference from other embodiments. Particularly, because the embodiment of the apparatus for controlling radio frequency exposure of the wireless device and the embodiment of the wireless device are basically similar to the method embodiments, the descriptions are relatively simple. For related parts, refer to descriptions in the method embodiments.

Although some preferred embodiments of this application have been described, a person skilled in the art can make changes and modifications to these embodiments once they learn of the basic inventive concept. Therefore, the following claims are intended to be construed as to cover the preferred embodiments and all changes and modifications falling within the scope of this application.

The foregoing implementations of this application are not intended to limit the protection scope of this application.

What is claimed is:

1. A method for controlling radio frequency exposure of a wireless device, wherein the method comprises:
    obtaining an average radio frequency exposure value over a target time window corresponding to a controlled time window, wherein the target time window is a standard time window, wherein a start moment of the controlled time window is an end moment of the target time window, and wherein duration of the controlled time window is shorter than duration of the standard time window;
    storing a preset correspondence between a preset value range of the average radio frequency exposure value and a preset power based on an application scenario; and
    controlling a transmit power of the wireless device based on a power threshold over the controlled time window such that the average radio frequency exposure value of the wireless device in any standard time window is less than or equal to a standard radio frequency exposure value, wherein the power threshold is based on the stored preset correspondence.

2. The method of claim 1, wherein the power threshold is a transmit power threshold, and wherein controlling the transmit power comprises adjusting an actual transmit power of the wireless device over the controlled time window such that the actual transmit power is less than or equal to the transmit power threshold.

3. The method of claim 1, wherein the power threshold is a power back-off amount threshold, wherein controlling the transmit power comprises controlling, over the controlled time window, a transmit power back-off of the wireless device based on a target power back-off amount, and wherein the target power back-off amount is greater than or equal to the power back-off amount threshold.

4. The method of claim 1, wherein obtaining the average radio frequency exposure value over the target time window comprises:
    obtaining one or more first real-time transmit powers of the wireless device in a preset period over the target time window;
    generating a first addition value by adding all the first real-time radio frequency exposure values corresponding to the first real-time transmit powers; and
    generating the average radio frequency exposure value comprising a ratio of the first addition value to a first quantity of the first real-time transmit powers.

5. The method of claim 1, wherein obtaining the average radio frequency exposure value over the target time window comprises:
    dividing the target time window into at least two time sub-windows;
    obtaining one or more second real-time transmit powers of the wireless device in each of the time sub-windows;
    generating a second addition value by adding all the second real-time radio frequency exposure values corresponding to the second real-time transmit powers; and
    generating the average radio frequency exposure value comprising a ratio of the second addition value to a second quantity of the at least two time sub-windows.

6. The method of claim 1, wherein obtaining the average radio frequency exposure value over the target time window comprises:
   dividing the target time window into at least two time sub-windows;
   obtaining a sub-window average radio frequency exposure value over each of the time sub-windows;
   generating a third addition value by adding all the sub-window average radio frequency exposure values; and
   generating the average radio frequency exposure value comprising a ratio of the third addition value to a second quantity of the at least two time sub-windows.

7. An apparatus for controlling radio frequency exposure of a wireless device, wherein the apparatus comprises:
   an obtaining system configured to obtain an average radio frequency exposure value over a target time window corresponding to a controlled time window, wherein the target time window is a standard time window, wherein a start moment of the controlled time window is an end moment of the target time window, and wherein duration of the controlled time window is shorter than duration of the standard time window; and
   a processor configured to:
   store a preset correspondence between a preset value range of the average radio frequency exposure value and a preset power based on an application scenario; and
   control a transmit power of the wireless device based on a power threshold over the controlled time window such that the average radio frequency exposure value of the wireless device in any standard time window is less than or equal to a standard radio frequency exposure value, wherein the power threshold is based on the stored preset correspondence.

8. The apparatus of claim 7, wherein the power threshold is a transmit power threshold, and wherein the processor is further configured to adjust an actual transmit power of the wireless device over the controlled time window such that the actual transmit power is less than or equal to the transmit power threshold.

9. The apparatus of claim 7, wherein the power threshold is a power back-off amount threshold, wherein the processor is further configured to control, over the controlled time window, a transmit power back-off of the wireless device based on a target power back-off amount, and wherein the target power back-off amount is greater than or equal to the power back-off amount threshold.

10. The apparatus of claim 7, wherein the obtaining system is further configured to:
    obtain one or more first real-time transmit powers in a preset period over the target time window;
    generate a first addition value by adding all the first real-time radio frequency exposure values corresponding to the first real-time transmit powers; and
    generate the average radio frequency exposure value comprising a ratio of the first addition value to a first quantity of the first real-time transmit powers.

11. The apparatus of claim 7, wherein the obtaining system is further configured to:
    divide the target time window into at least two time sub-windows;
    obtain a second real-time transmit power in each of the time sub-windows;
    generate a second addition value by adding all the second real-time radio frequency exposure values corresponding to the second real-time transmit powers; and
    generate the average radio frequency exposure value comprising a ratio of the second addition value to a second quantity of the at least two time sub-windows.

12. The apparatus of claim 7, wherein the obtaining system is further configured to:
    divide the target time window into at least two time sub-windows;
    obtain a sub-window average radio frequency exposure value over each of the time sub-windows;
    generate a third addition value by adding all the sub-window average radio frequency exposure values; and
    generate the average radio frequency exposure value comprising a ratio of the third addition value to a second quantity of the at least time sub-windows.

13. A wireless device comprising:
    an apparatus for controlling radio frequency exposure of the wireless device, wherein the apparatus is configured to:
    obtain an average radio frequency exposure value over a target time window corresponding to a controlled time window, wherein the target time window is a standard time window, wherein a start moment of the controlled time window is an end moment of the target time window, and wherein duration of the controlled time window is shorter than duration of the standard time window;
    store a preset correspondence between a preset value range of the average radio frequency exposure value and a preset power based on an application scenario ; and
    control a transmit power of the wireless device based on a power threshold over the controlled time window such that the average radio frequency exposure value of the wireless device in any standard time window is less than or equal to a standard radio frequency exposure value, wherein the power threshold is based on the stored preset correspondence.

14. The wireless device of claim 13, wherein the power threshold is a transmit power threshold.

15. The wireless device of claim 14, wherein the apparatus is further configured to adjust an actual transmit power of the wireless device over the controlled time window such that the actual transmit power is less than or equal to the transmit power threshold.

16. The wireless device of claim 13, wherein the power threshold is a power back-off amount threshold.

17. The wireless device of claim 16, wherein the apparatus is further configured to control, over the controlled time window, a transmit power back-off of the wireless device based on a target power back-off amount, and wherein the target power back-off amount is greater than or equal to the power back-off amount threshold.

18. The wireless device of claim 13, wherein the apparatus is further configured to:
    obtain one or more first real-time transmit powers of the wireless device in a preset period over the target time window;
    generate a first addition value by adding all the first real-time radio frequency exposure values corresponding to the first real-time transmit powers; and
    generate the average radio frequency exposure value comprising a ratio of the first addition value to a first quantity of the first real-time transmit powers.

19. The wireless device of claim 13, wherein the apparatus is further configured to:
    divide the target time window into at least two time sub-windows;

obtain one or more second real-time transmit powers of the wireless device in each of the time sub-windows;

generate a second addition value by adding all the second real-time radio frequency exposure values corresponding to the second real-time transmit powers; and generate the average radio frequency exposure value comprising a ratio of the second addition value to a second quantity of the at least two time sub-windows.

20. The wireless device of claim 13, wherein the apparatus is further configured to:

divide the target time window into at least two time sub-windows;

obtain a sub-window average radio frequency exposure value over each of the time sub-windows;

generate a third addition value by adding all the sub-window average radio frequency exposure values; and generate the average radio frequency exposure value comprising a ratio of the third addition value to a second quantity of the at least two time sub-windows.

\* \* \* \* \*